United States Patent [19]

Tate

[11] Patent Number: 4,807,900
[45] Date of Patent: Feb. 28, 1989

[54] TRAILER HITCH HAVING ROTATABLE DRAW PLATE

[76] Inventor: Woodrow R. Tate, Rte. 5, Box 1670, Henderson, Tex. 75652

[21] Appl. No.: 91,587

[22] Filed: Aug. 31, 1987

[51] Int. Cl.⁴ .............................................. B60D 1/06
[52] U.S. Cl. ............................... 280/491.3; 280/416.1
[58] Field of Search .......... 280/491 R, 491 B, 491 A, 280/415 A, 488, 498, 499, 495, 500, 477

[56] References Cited

U.S. PATENT DOCUMENTS

| | | | |
|---|---|---|---|
| 2,453,556 | 11/1948 | Vars | 280/500 X |
| 2,717,164 | 9/1955 | Meyer | 280/491 B |
| 3,782,760 | 1/1974 | Mann | 280/491 B X |
| 3,979,138 | 9/1976 | George et al. | 280/491 B X |
| 4,109,930 | 8/1978 | Pilhall | 280/491 B |
| 4,482,167 | 11/1984 | Haugrud | 280/491 B |

Primary Examiner—David M. Mitchell
Assistant Examiner—Charles R. Watts
Attorney, Agent, or Firm—John M. Harrison

[57] ABSTRACT

A trailer hitch having a rotatable draw plate, which trailer hitch is characterized by a metal frame adapted for mounting on the bumper plate of a truck bumper and a pivot plate rotatably attached to the frame for selectively positioning a removable hitch ball outwardly of the housing in functional configuration and inwardly of the housing in non-functional configuration. The pivot plate is secured with the hitch ball in selective functional and non-functional configuration by means of a latch located in the frame. In a preferred embodiment, the trailer hitch is bolted to the bumper plate of the truck and is located beneath the bumper plate and bumper.

3 Claims, 1 Drawing Sheet

TRAILER HITCH HAVING ROTATABLE DRAW PLATE

BACKGROUND OF THE INVENTION

1. Field of the Invention

This invention relates to trailer hitches and more specifically, to a trailer hitch mounted to the bumper of a truck or other vehicle and having a rotatable draw plate for selectively deploying the draw plate and companion hitch ball outwardly of the trailer hitch in functional configuration, and inwardly of the trailer hitch housing in retracted, non-functional configuration.

Trailer hitches are conventionally mounted on the bumpers or frames of vehicles such as trucks and cars with a draw bar extending rearwardly of the bumper and a hitch ball bolted or otherwise secured to the pivoting end of the draw bar. When not in use, such hitches constitute a safety hazard and also detract from the esthetics of the vehicle. Since the draw bar and hitch ball extend outwardly from the bumper just below the knee of a person of average height, bumping of the shin and knee area of the legs against the hitch sometimes occurs when walking around the rear of the vehicle. The trailer hitch embodied in this invention includes a rotatable draw plate which operates to selectively extend the hitch ball in functional configuration rearwardly of the vehicle bumper for attachment to a trailer and inwardly of the trailer hitch housing through the plane of the bumper, when not in use.

2. Description of the Prior Art

Various trailer hitch mechanisms are known in the art for recessing or folding the draw bar and hitch ball of a trailer hitch. U.S. Pat. No. 2,474,231, dated June 28, 1949, to R. V. Crosely, discloses a "Sliding Ball Hitch For Automobiles". The sliding ball hitch detailed in this patent is characterized by a casing adapted to be connected to the rear of an automobile and having an opening in the rear end thereof, the casing further provided with interior shoulder portions and a block slidable in and out of the casing through the rear opening. The block is further provided with portions adapted to engage the shoulder portions of the casing, in order to limit outward movement of the block and the block is also provided with a recess having a sloping surface in the upper surface thereof. A latch plate having an upwardly-extending lip on the outer edge is positioned in the recess and a spring is located in the block for urging the plate upwardly to lock the block in the extended position. A ball is connected to the block for connecting the trailer hitch to the hitch device of a trailer. U.S. Pat. No. 3,117,805, dated Jan. 14, 1964, to W. A. Schoeffler, discloses a "Traler Hitch", the rear end section of which is bolted to the vehicle and the front end section being vertically pivotally attached to the rear end section, for rotating the draw bar and hitch ball into and out of functional orientation with respect to the vehicle. Another trailer hitch is disclosed in U.S. Pat. No. 3,480,296, dated Nov. 25, 1969, to E. L. Starling. The trailer hitch detailed in this patent is designed for mounting in a vehicle bumper and includes a draw bar pivotally mounted within a recess in the bumper, for swinging movement between a draft position outwardly extending from the bumper and a position with the draw bar fully retracted within the recess in the bumper to present a clean, uncluttered bumper surface. U.S. Pat. No. 4,109,930, dated Aug. 29, 1978, to S. T. L. Pilhall, discloses a "Towing Device For Motor Vehicles". The towing device embodied in this patent includes an upwardly-directed portion which is shaped as a ball and connected to the bumper and which, in a storage position, is covered by a removable or slidable portion of the bumper. The ball portion is connected to the bumper beam in such a manner that it can be moved between the storage position located in a storage space in the bumper beam and a towing position completely outside of the storage space. A "Hinged Bi-Level Hitch For A Vehicle" is disclosed in U.S. Pat. No. 4,275,899, dated June 30, 1981, to Verle L. Humphrey. This patent details a heavy-duty, hinged bi-level hitch for mounting on a tubular bumper of a vehicle. The hitch includes an upper hitch assembly with an upper hitch ball, which upper hitch assembly is integrally formed in the center of the bumper. A lower hitch assembly is pivotally attached to the bottom of the bumper. The lower hitch assembly can be pivoted from a raised storage position underneath the vehicle to a lowered position directed below the upper hitch assembly by loosening a pair of bolts. U.S. Pat. No. 4,482,167, dated Nov. 13, 1984, to H. L. Haugrud, discloses a "Retractable Hitch". The retractable hitch is designed for attachment beneath the bumper of a vehicle and the tow bar of the hitch is held in a retracted position by a pivotal wall locked in place. Alternatively, the tow bar may be clamped into an operational position by the same pivotal wall locked in place. The retractable hitch is operated into and out of the functional configuration by moving a handle beneath the hitch and rotating the tow bar, as desired. U.S. Pat. No. 4,540,194, dated Sept. 10, 1985, to Roy Dane, discloses a trailer hitch which includes a plate that is adapted to selectively lie flush with the bed of the truck or other vehicle and extend upwardly for attachment to a trailer. A hitch block, which has a connecting ball at one end, is journalled on an axis below the plate in such a manner, that when disposed in the towing position, the ball is located above the plate and when the vehicle is used for hauling, the entire block can be folded down beneath the bed of the vehicle. The opposite end of the block is provided with a spring-biased, retractable pin and an arcuate member located beneath the plate is provided with holes which receive the pin to hold the block in a selected position.

It is an object of this invention to provide a new and improved, heavy-duty trailer hitch having a rotatable draw plate for selectively orienting a hitch ball in functional towing configuration outwardly of the trailer hitch housing and rotating the hitch ball inwardly of the trailer hitch housing when not in use.

Another object of this invention is to provide a new and improved trailer hitch having a rotatable draw plate, which trailer hitch is designed for removably mounting to the bumper of a pick-up truck or other vehicle and is designed to selectively deploy the hitch ball outwardly of the vehicle bumper when in functional configuration and inwardly of the trailer hitch housing and inside the vertical plane of the vehicle bumper when in rotated, non-functional configuration, responsive to manipulation of a latch mechanism and rotation of the draw plate.

Still another object of the invention is to provide a trailer hitch having a rotatable draw plate, the frame of which trailer hitch is mounted on the bumper of a pick-up truck and is operable to locate the hitch ball outwardly of the plane of the bumper for coupling to the hitch mechanism of a trailer and inwardly of the trailer hitch housing and retracted inside the plane of the bumper when not in use.

A still further object of this invention is to provide a new and improved trailer hitch having a rotatable draw plate which is capable of removably receiving hitch balls of varying diameter and wherein a first hitch ball is mounted to the draw plate and a second hitch ball is mounted to the bumper and trailer hitch housing.

Yet another object of the invention is to provide a new and improved trailer hitch having a curved, rotatable draw plate, which trailer hitch is characterized by a housing having a ball clearance opening and is adapted for mounting on the bumper plate of a pick-up truck bumper and is rugged in construction and designed to tow trailers of substantially any size, with the capability of rotatably deploying the hitch ball outwardly of the bumper when in functional configuration and retracting the hitch ball through the ball clearance opening inside the trailer hitch housing when in stored configuration, responsive to manipulation of a latch and rotation of the draw plate with respect to the housing.

SUMMARY OF THE INVENTION

These and other objects of the invention are provided in a new and improved trailer hitch having a rotatable, curved draw plate for bolting to the bumper of a pick-up truck, which trailer hitch includes a latch mechanism for securing and releasing the draw plate and selectively deploying the trailer hitch ball outwardly of the trailer hitch housing in functional configuration and inwardly of the trailer hitch housing through a ball clearance opening, when retracted and not in use.

The invention will be better understood by reference to the accompanying drawing, wherein.

DESCRIPTION OF THE PREFERRED EMBODIMENTS

Figure 1:
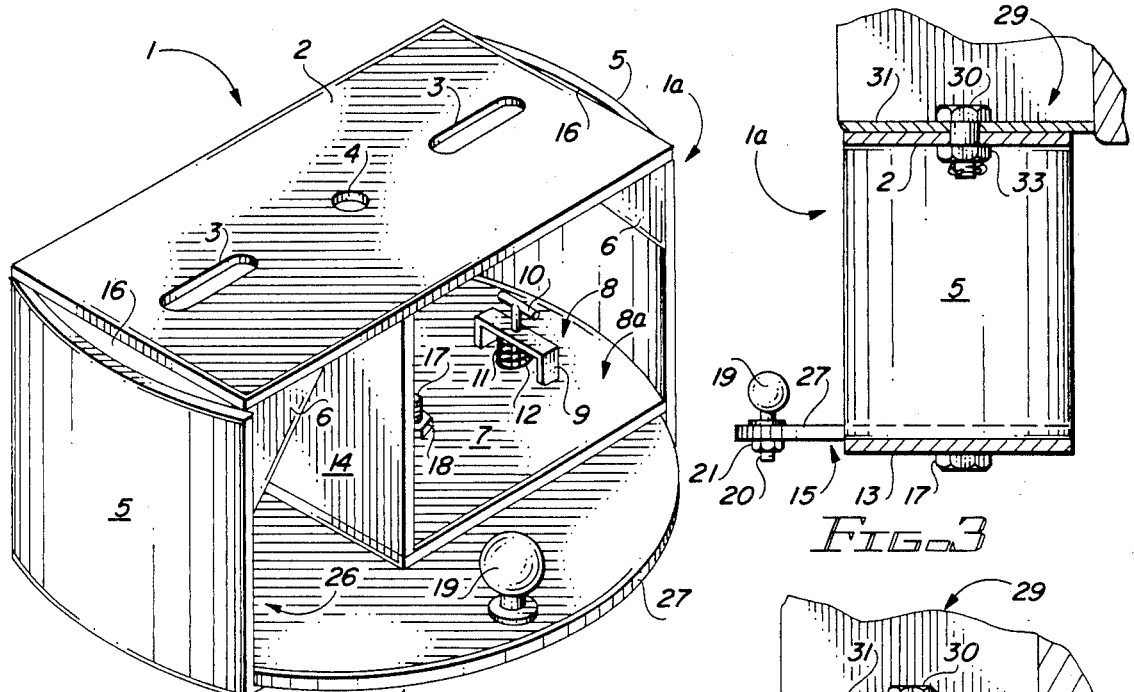
FIG. 1 is a front perspective view of the trailer hitch of this invention oriented in functional configuration for mounting on the bumper plate of a pick-up truck.
Figure 2:
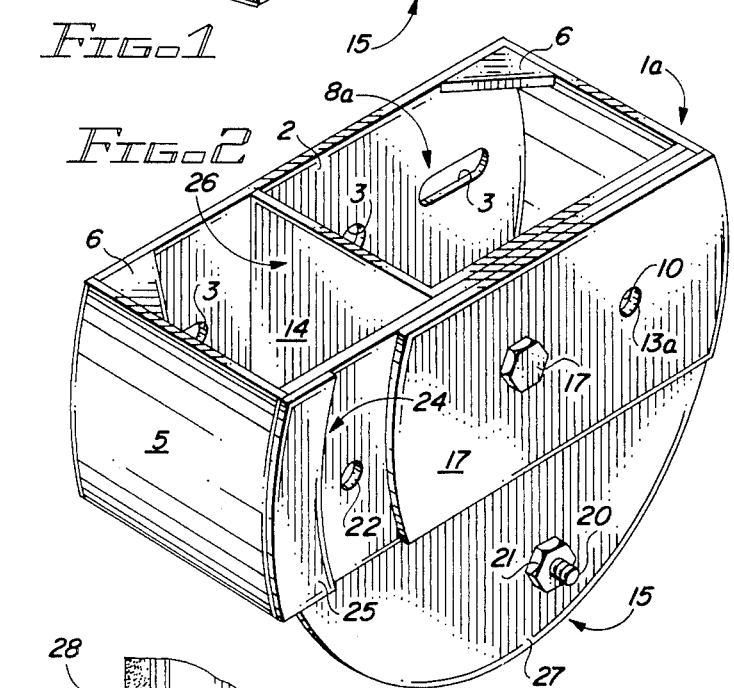
FIG. 2 is a bottom perspective view of the trailer hitch illustrated in FIG. 1.
Figure 3:
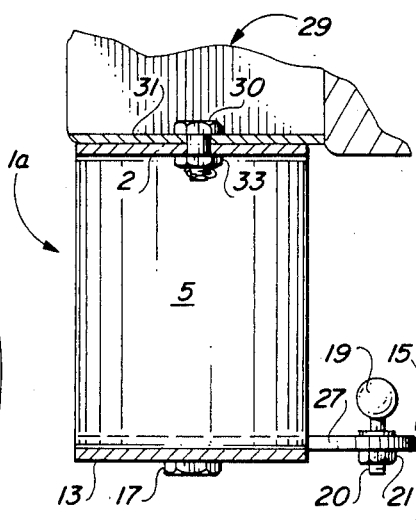
FIG. 3 is a side sectional view of the trailer hitch illustrated in FIG. 1, with the pivot plate deployed in functional configuraton outwardly of the hitch housing.
Figure 5:
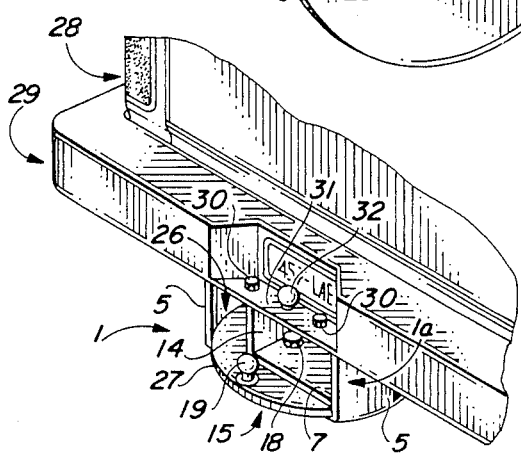
FIG. 5 is a top view of the pivot plate element of the trailer hitch of this invention.
Figure 6:
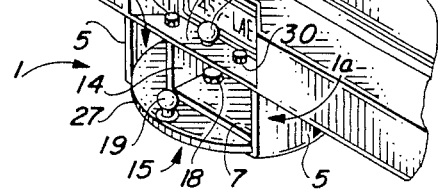
FIG. 6 is a perspective view of the trailer hitch illustrated in FIG. 1 mounted in functional configuration on the bumper of a pick-up truck.

Referring initially to FIGS. 1, 2, 3 and 6 of the drawings, the trailer hitch of this invention is generally illustrated by reference numeral 1. The trailer hitch 1 includes a frame 1a, having a flat bumper mount plate 2, for securing the trailer hitch 1 to the conventional bumper plate 31 of the bumper 29 in a truck 28, by means of hitch mount bolts 30 and cooperating mount nuts 33. The bumper 29 is mounted on the truck 28 in conventional fashion and the trailer hitch 1 is suspended beneath the bumper plate 21 of the bumper 29 by means of the hitch mount bolts 30 and mount nuts 33, as illustrated. In a most preferred embodiment of the invention, a pair of mount slots 3 are provided in the bumper mount plate 2 in spaced relationship, in order to receive the hitch mount bolts 30 in adjustable fashion and accommodate a wide variety of hole spacings in the bumper plate 31. A ball mount hole 4 is also provided in the bumper mount plate 2 between the mount slots 3, in order to accommodate an auxiliary hitch ball 32, as illustrated in FIG. 6. The frame 1a of the trailer hitch 1 is completed by a pair of curved, downwardly extending side plates 5, one of which side plates 5 is welded or otherwise attached to a curved groove plate 25 and the other of which is secured to a rounded bottom mount plate 13, as illustrated in FIG. 2. The bottom mount plate 13 and the groove plate 25 define a curved clearance groove 24, which exists for a purpose which will be hereinafter further described. In a most preferred embodiment of the invention and referring again to FIG. 1, the bumper mount plate 2 to side plates 5 welds are strengthened by a pair of plate gussets 6 and the bottom edge of one of the side plates 5 is welded to a top mount plate 7, which extends parallel to the bumper mount plate 2. A partition plate 14 projects downwardly from welded attachment to the bumper mount plate 2 and is secured at the bottom edge thereof to the projecting edge of the top mount plate 7, in order to define a latch chamber 8a, provided with a latch 8, as illustrated. A pair of thin plate fillers 16 are welded between the curved top edges of the side plates 5 and the corresponding edges of the bumper mount plate 2, respectively, to strengthen the frame 1a. A ball clearance opening 26 is defined by the downwardly-extending partition plate 14 and the opposite one of the side plates 5 and the ball clearance opening 26 lies adjacent to the latch chamber 8a, as illustrated. The latch 8 provided in the latch chamber 8a is further characterized by a latch bracket 9, the legs of which are welded or otherwise attached to the top mount plate 7 and a t-bar 10, slidably mounted in the horizontal segment of the latch bracket 9. A coil spring 11 is mounted on the t-bar 10 and is disposed between the latch bracket 9 and a spring washer 12, which is welded or otherwise attached to the t-bar 10, in order to spring-load and bias the extending end of the t-bar 10 downwardly through an opening (not illustrated) in the top mount plate 7 and into a corresponding and registering opening 22, provided in the underlying pivot plate 15, and a bottom mount plate opening 13a, located in the bottom mount plate 13. As illustrated in FIG. 5, the pivot plate 15 is rotatably disposed between the spaced top mount plate 7 and bottom mount plate 13 and includes a curved front margin 27 and a pair of spaced spring pin openings 22, a pivot bolt opening 23 and a hitch ball 19. The pivot plate 15 is rotatably attached to the top mount plate 7 and the bottom mount plate 13 by means of a pivot bolt 17, which extends through the pivot bolt opening 23 and corresponding registering openings (not illustrated) drilled in the top mount plate 7 and bottom mount plate 13 and is secured by a cooperating pivot nut 18. The hitch ball 19 is secured to the pivot plate 15 near the front margin 27 of the pivot plate 15 by means of a ball mount nut 21, which is threaded on the ball mount bolt 20, which projects through a companion opening (not illustrated) drilled in the pivot plate 15, as illustrated.

Referring again to FIGS. 1, 3 and 6 of the drawing, the pivot plate 15 is rotatably mounted between the top mount plates 7 and the bottom mount plate 13 on the pivot bolt 17 such that the hitch ball 19 is extended outwardly of the ball clearance opening 26 in functional configuration. When so located, the hitch ball 19 is deployed for attachment to the hitch mechanism of a trailer (not illustrated) in conventional manner.

Figure 4:
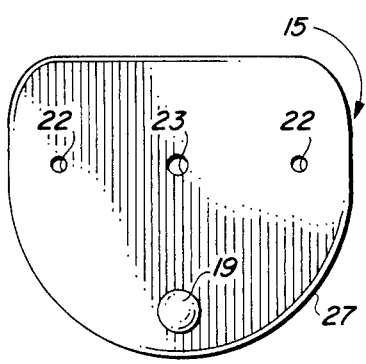
FIG. 4 is a sectional view of the trailer hitch illustrated in FIG. 1, with the pivot plate rotated such that the hitch ball is located inwardly of the trailer hitch housing.

Referring to FIGS. 1, 2 and 5 of the drawing and as heretofore noted, the pivot plate 15 is rotatably disposed between the spaced top mount plate 7 and bottom mount plate 13 on the pivot bolt 17 by means of the pivot bolt 17. Furthermore, the projecting end of the t-bar 10 extends through a hole (not illustrated) provided in the top mount plate 7 and the spring pin opening 22 which is aligned with the corresponding opening in the top mount plate 7 (not illustrated), and into the bottom mount plate opening 13a, in order to selectively lock the pivot plate 15 in functional configuration as illustrated in FIGS. 1 and 2 and in folded or non-functional configuration, as illustrated in FIG. 4. Rotation of the hitch ball 19 from the functional configuration to the locked configuration is effected by lifting the t-bar 10 upwardly against the bias in the spring 11 to clear the extending end of the t-bar 10 from the bottom mount plate opening 13a and companion spring pin opening 22 in the pivot plate 15, to allow the pivot plate 15 to rotate on the pivot bolt 17, such that the curved front margin 27 clears the side plates 5 and the hitch ball 19 moves through the ball clearance opening 26, to the position illustrated in FIG. 4. As illustrated in FIG. 2, this movement also allows the ball mount nut 21 and the extending end of the ball mount bolt 20 to traverse the clearance groove 24 and facilitates relocation of the opposite spring pin opening 22 adjacent the t-bar 10, such that subsequent release of the t-bar 10 responsive to the bias in the spring 11, extends the end of the t-bar 10 through the relocated spring pin opening 22 and the fixed bottom mount plate opening 13a.

Referring again to FIGS. 3 and 4 of the drawing, it will be appreciated that the hitch ball 19 is conveniently stored rearwardly of the frame 1a, as illustrated in FIG. 4, to prevent injury resulting from stiking the hitch ball 19 when it is deployed as illustrated in FIG. 3. Furthermore, this deployment of the hitch ball 19 enhances the appearance of the trailer hitch 1.

In a most preferred embodiment of the invention, the frame 1a is constructed of steel and the rotatable pivot plate 15 is cut from steel plate stock having a thickness of about ⅜ inch. The pivot bolt 17 is typically about 1 inch in diameter and the side plates 5 are most preferably constructed of segments of 14-inch pipe.

Referring again to FIG. 1 of the drawing, the mount slots 3 facilitate adjustment of the bumper mount plate 2 on the bumper plate 31 and bumper 29 of substantially any truck 28, using a variety of spacings for the hitch mount bolts 30. Furthermore, since the pivot plate 15 is curved at the front margin 27 and around the sides and since the side plates 5 are also curved to accommodate the pivot plate 15, the pivot plate 15 cannot exit the frame 1a, even if the pivot bolt 17 and t-bar 10 should fail. This serves as an additional safety factor in the construction of the trailer hitch 1.

While the preferred embodiments of the invention have been described above, it will be recognized and understood that various modifications may be made and used therein and the appended claims are intended to cover all such modifications and combinations which may fall within the spirit and scope of the invention.

Accordingly, having described my invention with the particularity set forth above, what is claimed is:

1. A trailer hitch adapted for mounting on the bumper of a truck, comprising:
   (a) a frame characterized by a bumper mount plate adapted for attachment to said bumper; a pair of side plates downwardly extending from opposite edges of said bumper mount plate in substantially parallel relationship; a partition plate downwardly extending from fixed attachment to said bumper mount plate between said side plates, with the space between said partition plate and one of said side plates defining a ball clearance opening in said frame; a top mount plate extending from fixed attachment to said partition plate to said one of said side plates in substantially parallel relationship with respect to said bumper mount plate, with the space between said partition plate and the other of said side plates defining a latch chamber; and a bottom mount plate carried by said side plates and spaced in substantially parallel relationship from said top mount plate, said bottom mount plate defining the bottom of said frame;
   (b) a pivot plate having a curved front margin rotatably positioned between said top mount plate and said bottom mount plate and spanning said side plates and a pivot bolt extending through said top mount plate and said bottom mount plate, said pivot bolt also projecting through said pivot plate for rotatably anchoring said pivot plate between said top mount plate and said bottom mount plate;
   (c) attachment means carried by said pivot plate rearwardly of said curved front margin for securing a trailer to said pivot plate; and
   (d) a latch bracket mounted on said top mount plate in said latch chamber, a t-bar slidably carried by said latch bracket and normally projecting through said top mount plate into engagement with said pivot plate for immobilizing said pivot plate and a coil spring carried by said t-bar between said latch bracket and said top mount plate, for biasing said t-bar into engagement with said pivot plate, whereby said pivot plate is rotatable between said top mount plate and said bottom mount plate to selectively locate said attachment means outwardly of said frame in functional configuration for attachment to a trailer and inwardly of said frame in non-functional configuration, responsive to manipulaton of said t-bar.

2. The trailer hitch of claim 1 further comprising a pair of mount slots provided in spaced relationship in said bumper mount plate for adjustably mounting said trailer hitch on the bumper of the truck.

3. The trailer hitch of claim 2 wherein said attachment means further comprises a hitch ball and a ball nut threadibly secured to said hitch ball for removably securing said hitch ball on said pivot plate.

* * * * *